(12) United States Patent
Tymkewicz et al.

(10) Patent No.: US 7,297,016 B1
(45) Date of Patent: Nov. 20, 2007

(54) THERMOCOUPLE CONNECTOR AND CONNECTOR ARRANGEMENT WITH ENHANCED CONNECTIVITY FEATURES

(75) Inventors: Allen Tymkewicz, Westlake, OH (US); Gary Kloock, Berea, OH (US); Rodney Collins, North Olmsted, OH (US)

(73) Assignee: Marlin Manufacturing Corporation, Cleveland, OH (US)

( * ) Notice: Subject to any disclaimer, the term of this patent is extended or adjusted under 35 U.S.C. 154(b) by 0 days.

(21) Appl. No.: 11/620,204

(22) Filed: Jan. 5, 2007

Related U.S. Application Data (60) Provisional application No. 60/758,446, filed on Jan. 12, 2006.

(51) Int. Cl.
*H01R 13/58* (2006.01)
(52) U.S. Cl. ............... 439/459; 439/460; 439/695; 439/913
(58) Field of Classification Search ............... 439/459, 439/460, 695, 696, 697, 731, 913
See application file for complete search history.

(56) References Cited

U.S. PATENT DOCUMENTS

| | | | | |
|---|---|---|---|---|
| 2,211,591 A | * | 8/1940 | Benander | ............... 439/459 |
| 2,429,278 A | | 10/1947 | Roche | |
| 2,543,951 A | | 3/1951 | Aime | |
| 3,519,980 A | * | 7/1970 | Mosley | ............... 439/459 |
| 4,192,567 A | * | 3/1980 | Gomolka | ............... 439/320 |
| 4,298,238 A | * | 11/1981 | Hayes | ............... 439/599 |
| 4,759,723 A | | 7/1988 | Siemon | |
| 4,781,614 A | | 11/1988 | Ahroni | |
| 5,295,857 A | | 3/1994 | Toly | |
| 6,183,304 B1 | * | 2/2001 | Hollander et al. | ..... 439/620.05 |
| 6,508,679 B2 | * | 1/2003 | Han et al. | ............... 439/696 |
| 6,843,682 B2 | * | 1/2005 | Matsuda et al. | ............ 439/596 |
| 2005/0112945 A1 | | 5/2005 | Park et al. | |

* cited by examiner

*Primary Examiner*—Thanh-Tam Le
(74) *Attorney, Agent, or Firm*—Pearne & Gordon LLP (57) ABSTRACT

A thermocouple connector arrangement that has a first connector configured to have a thermocouple probe lead extending therefrom and a second connector configured to have an electrical connection lead extending therefrom. Each connector has an interior configured to receive a terminus of the respective lead. The connectors include electrically conductive mating parts that, when mated, provide an electrical conduction path. At least one of the first and second connectors includes housing parts that mate in a snap-lock arrangement without the use of a threaded fastener to secure the housing parts together and to enclose the respective interior, one of the housing parts engages the respective terminus and secures the respective terminus against removal by shrouding an end of the respective conductive mating part and pressing the respective terminus into electrical contact with the respective conductive mating part during the mating of the housing parts.

11 Claims, 7 Drawing Sheets

THERMOCOUPLE CONNECTOR AND CONNECTOR ARRANGEMENT WITH ENHANCED CONNECTIVITY FEATURES

RELATED APPLICATION

Benefit of priority is claimed from Provisional Patent Application Ser. No. 60/758,446, filed Jan. 12, 2006.

BACKGROUND OF THE INVENTION

1. Field of the Invention

The present invention relates to thermocouple connectors, and more particularly to a connector arrangement having enhanced connectivity features.

2. Description of Prior Art

Connectors are utilized to interconnect a thermocouple probe or sensor or splice member within a thermocouple system. One portion of the connection arrangement is interconnected with a probe member. A second portion of the connection arrangement is connected to a wire that may extend to a strip panel. In turn, the strip panel may be operatively connected via cable or the like to one or more instruments.

It is known to use screws to connect wire leads and screws that secure a cover onto a body of at least one portion of the connector arrangement. It is labor intensive to provide such connections. Also, such construction may not provide for ease of variation of component parts.

BRIEF SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In accordance with an aspect of the present invention, a thermocouple connector arrangement includes a first connector configured to have a thermocouple probe lead extending therefrom. The first connector has an interior configured to receive an electrical connection terminus of the thermocouple probe lead. A second connector of the arrangement is configured to have an electrical connection lead extending therefrom. The second connector has an interior configured to receive a terminus of the electrical connection lead. The first and second connectors include electrically conductive mating parts that, when mated, provide an electrical conduction path between the thermocouple probe lead and the electrical connection lead. At least one of the first and second connectors includes housing parts that mate in a snap-lock arrangement to secure the housing parts together and to enclose the respective interior. The at least one of the first and second connectors includes structure that engages the respective terminus and secures the respective terminus against removal during the mating of the housing parts.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE OF EMBODIMENTS

The present invention relates to a thermocouple connector arrangement. The present invention will now be described with reference to the drawings, wherein like reference numerals are used to refer to like elements throughout. It is to be appreciated that the various drawings are not necessarily drawn to scale from one figure to another nor inside a given figure, and in particular that the size of the components are arbitrarily drawn for facilitating the understanding of the drawings. In the following description, for purposes of explanation, numerous specific details are set forth in order to provide a thorough understanding of the present invention. It may be evident, however, that the present invention can be practiced without these specific details.

Figure 1:
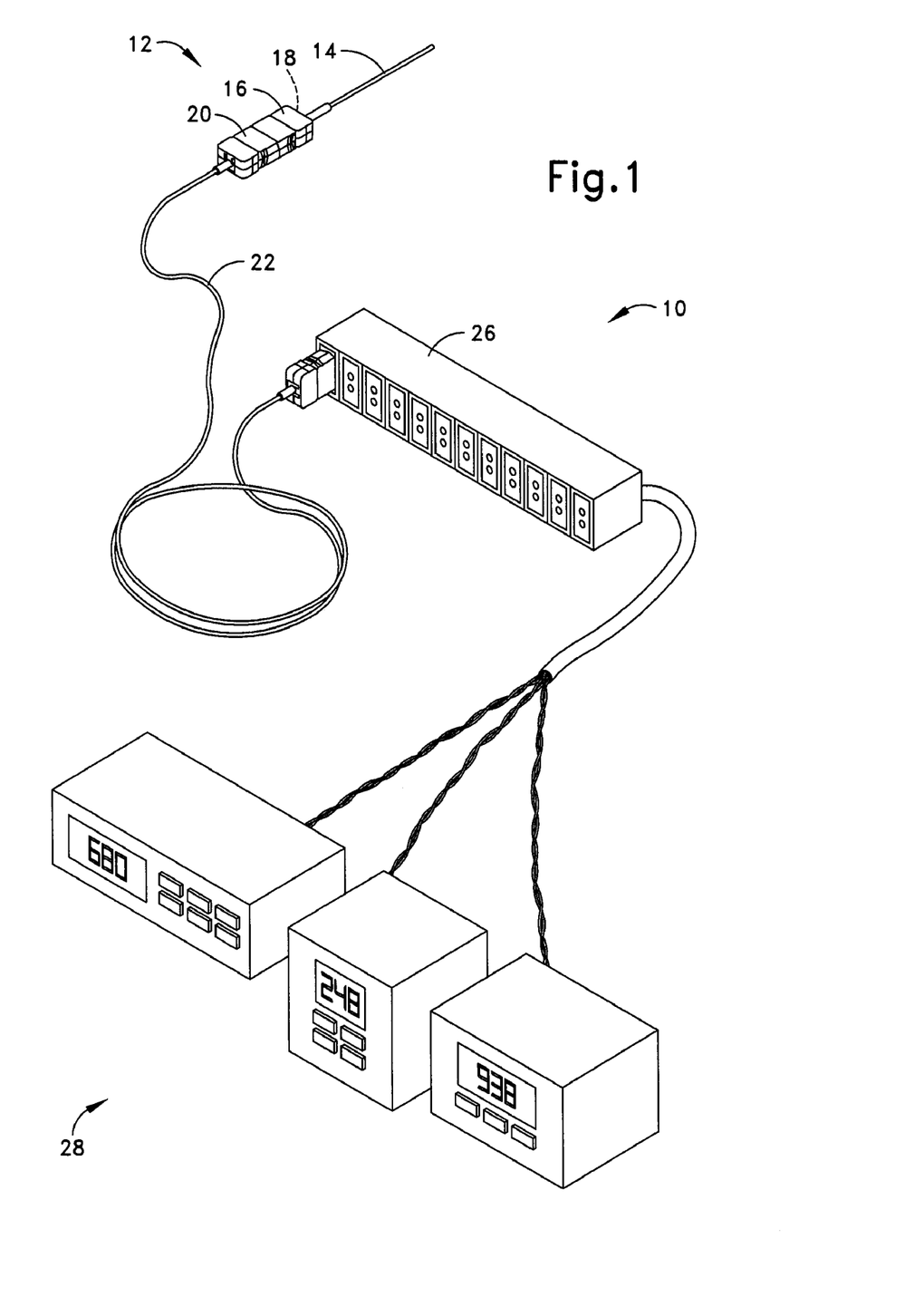
FIG. 1 illustrates a thermocouple system utilizing a thermocouple arrangement in accordance with an aspect of the present invention.

An example thermocouple system 10 that utilizes a thermocouple connector arrangement 12 in accordance with one aspect of the present invention is shown in FIG. 1. Within the thermocouple system 10, the connector arrangement 12 is utilized to connect a thermocouple probe or sensor member 14 to other portions of the system. In the shown example, the probe member 14 is elongate and rigid. However, it is contemplated that other configurations are possible.

A first connector 16 of the connection arrangement 12 is interconnected with the probe member 14. Specifically, the first connector 16 is configured to have a thermocouple probe lead 18 extending therefrom, and the first connector has an interior configured to receive an electrical connection terminus of the thermocouple probe lead. A second connector 20 of the connection arrangement 12 is connected to an electrical connection lead 22, such an elongate wire cable.

Further, the second connector 20 is configured to have the electrical connection lead extending therefrom, and the second connector has an interior configured to receive a terminus of the electrical connection lead. It is to be appreciated that the designations of first and second for the connectors are merely for ease of identification.

In the shown example system 10, the wire cable 22 extends to a strip panel 26. In turn, the strip panel 26 is operatively connected via cable or the like to one or more instruments 28. It is to be appreciated that the shown example system 10 may have different components, structure, etc., and these aspects of the system 10 are not specific limitations upon the present invention.

The first and second connectors 16 and 20 include electrically conductive mating parts that, when mated, provide an electrical conduction path between the thermocouple probe lead 18 and the wire cable (electrical connection lead) 22. The electrically conductive mating parts are described further below. However, it is to be appreciated that the specifics of the electrically conductive mating parts may not be a limitation on the present invention.

In accordance with one aspect, at least one of the first and second connectors 16, 20 includes housing parts that mate in a snap-lock arrangement to secure the housing parts together and to enclose the respective interior. Also in accordance with one another aspect, at least one of the first and second connectors 16, 20 includes structure that engages the respective terminus and secures the respective terminus against removal without the use of a threaded fastener As a further aspect, the one of the housing parts engages the respective terminus and secures the respective terminus against removal by shrouding an end of the respective conductive mating part and pressing the respective terminus into electrical contact with the respective conductive mating part during the mating of the housing parts. As yet another aspect, the engagement and securing accomplished without the use of a threaded fastener occurs during the mating of the housing parts.

Figure 2:
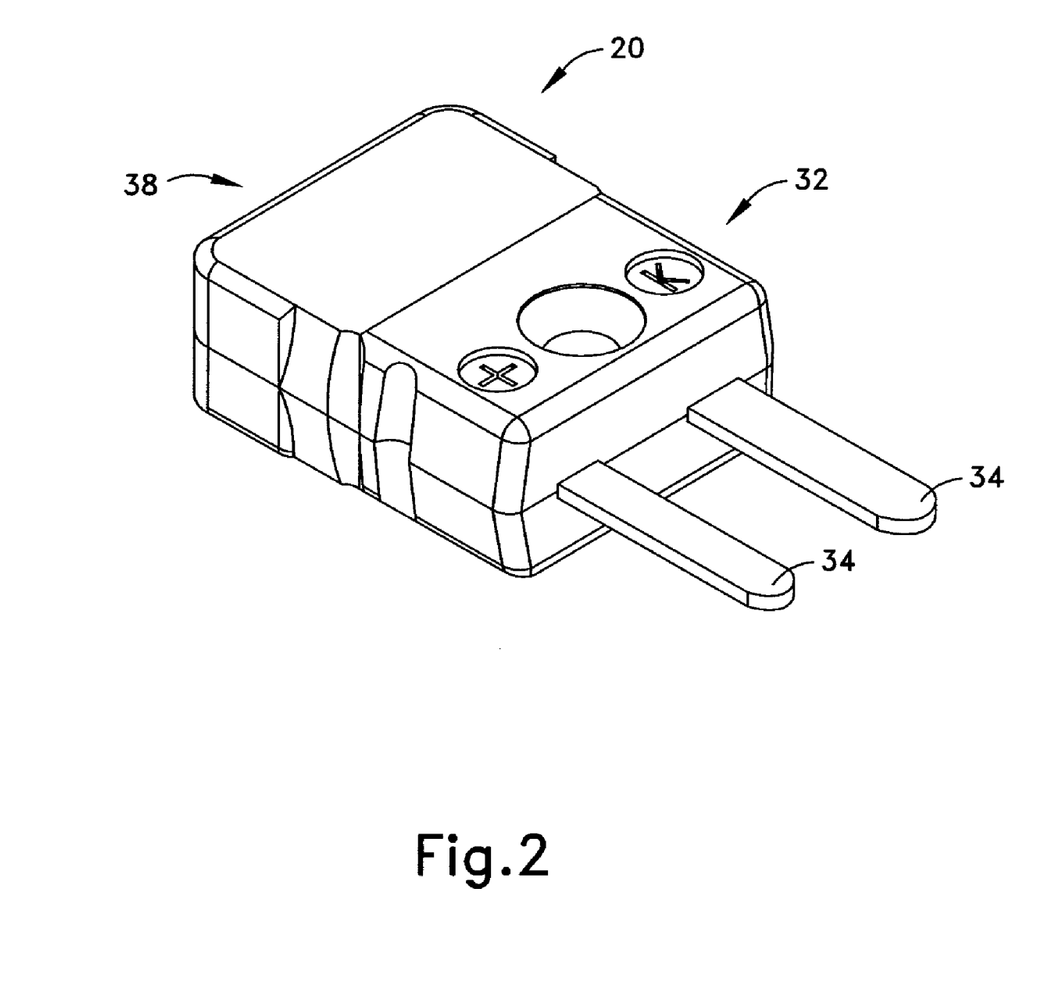
FIG. 2 illustrates a perspective view of a lower plug assembly for a thermocouple arrangement in accordance with an aspect of the present invention.

FIG. 2 is a perspective view of an example of a connector as used in the arrangement 12 of FIG. 1. The illustrated connector of FIG. 2 is a plug connector and the second connector 20 in the shown example of FIG. 1. It is to be appreciated that at least some of the structural features shown for the second connector 20 may be applicable for the first connector 16. The second connector 20 includes one housing part that is a body 32 from which two electrically conductive prongs 34 extend. Another housing part of the connector 20 is a cap 38 that snap-fits with the body 32.

Figure 3:
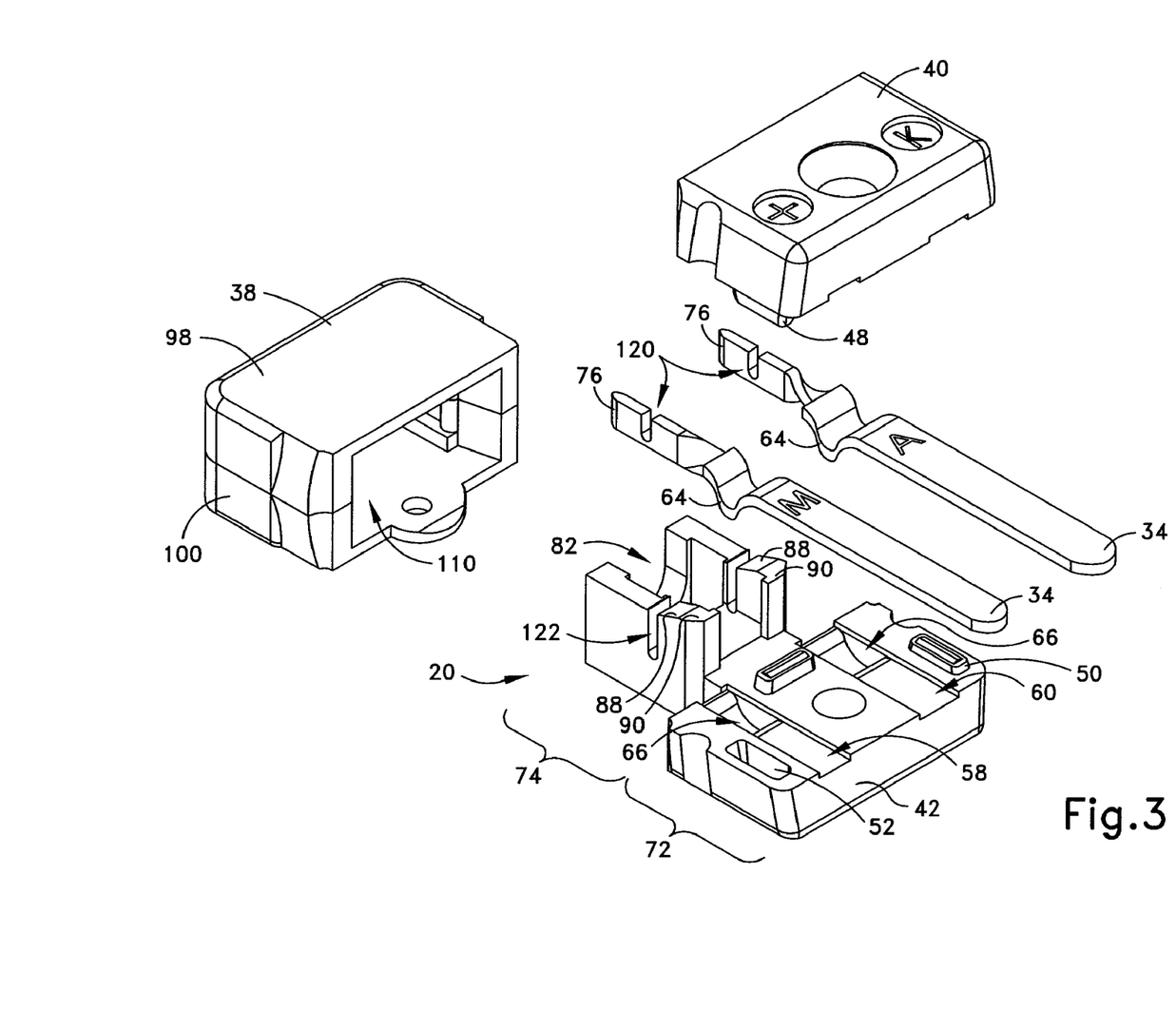
FIG. 3 illustrates an exploded view of a lower plug assembly for a thermocouple arrangement in accordance with an aspect of the present invention.

FIG. 3 illustrates an exploded view of the plug connector 20 of FIG. 2. Specifically, the body 32 has two body sections 40 and 42, which will be referred to here in as upper body section 40 and lower body section 42 for ease of reference only. The upper and lower body sections 40 and 42 can be made of a thermoplastic or the like and are coupled together and secured by any known or to be determined means. Alternatively, other construction techniques for the body, such as a mold-over technique, can be used. In the shown example, the upper body section 40 includes one or more recesses (not shown) and one or more projections 48, and the lower body section 42 includes one or more projections 50 and one or more recesses 52 to correspond with the one or more recesses and projections 48 in the upper body section 40, respectively. The respective projections and the recesses mate when the upper and lower body sections 40 and 42 are coupled together. It is to be noted that in one example, the projections 48 and 50 have structure that aid in securing the upper and lower body sections 40 and 42 together. For example, the structure may be raised material, e.g., in an elongate pyramidal shape, which flows upon occurrence of an ultrasonic welding procedure.

As can be appreciated by viewing FIG. 3, the upper and lower body sections 40 and 42 are configured to receive the prongs 34 at an interior portion of the body 32. Specifically, the upper and lower body sections 40 and 42 include recesses 58 and 60, respectively, in which segments of the prongs 34 lie. It should be noted that the prongs 34 have portions that mate with portions of at least one of the body sections 40 and 42. In the shown example, each prong 34 has an offset 64 (e.g., a U bend). The lower body section 42 has a corresponding low segment 66 within each of the recesses 58, 60. When the two body sections 40 and 42 are mated and secured together, the prongs 34 are retained therein.

The portion of the connector body 32 that retains the prongs 34 can be considered to be a first or front portion 72 of the body, and the end from which the prongs prominently extend can be considered to be the front end of the body. Such a front portion 72 would include the entire upper section 40 and the front of the lower section 42. A portion 74 of the lower section 42 does extend to the rear and could naturally be considered a rear portion 74 of the body 32.

As shown in FIG. 2, a substantial portion of each prong 34 extends from the front end of the body 32 for connection to the other connector 16. However, a rear end portion 76 of each prong 34 extends rearward from the front portion 72 of the body 32. The rear end portion 76 of each prong 34 is located at a respective side of the rear portion 74 of the body 32 (i.e., the rear of the lower body section). These prong end portions 76 are provided for electrical connection to wires of the wire cable 22, which will be described below.

Turning to the rear portion 74 of the body 32, it provides two functions. First, the rear portion 74 is configured to receive a crimp adapter 80 (FIG. 4) utilized in connecting the wire cable (the electrical connection lead) 22 to the connector 20. In the shown example, the rear portion 74 has a recess 82 that is configured in size and shape to mate with the crimp adapter 80 to cradle and retain the crimp adapter. As can be appreciated upon viewing FIG. 4, the crimp adapter 80, with a polygonal (e.g., square, hexagonal, etc.) portion, fits snugly into the recess 82, which is specifically shaped to retain the crimp adaptor 80.

Figure 4:
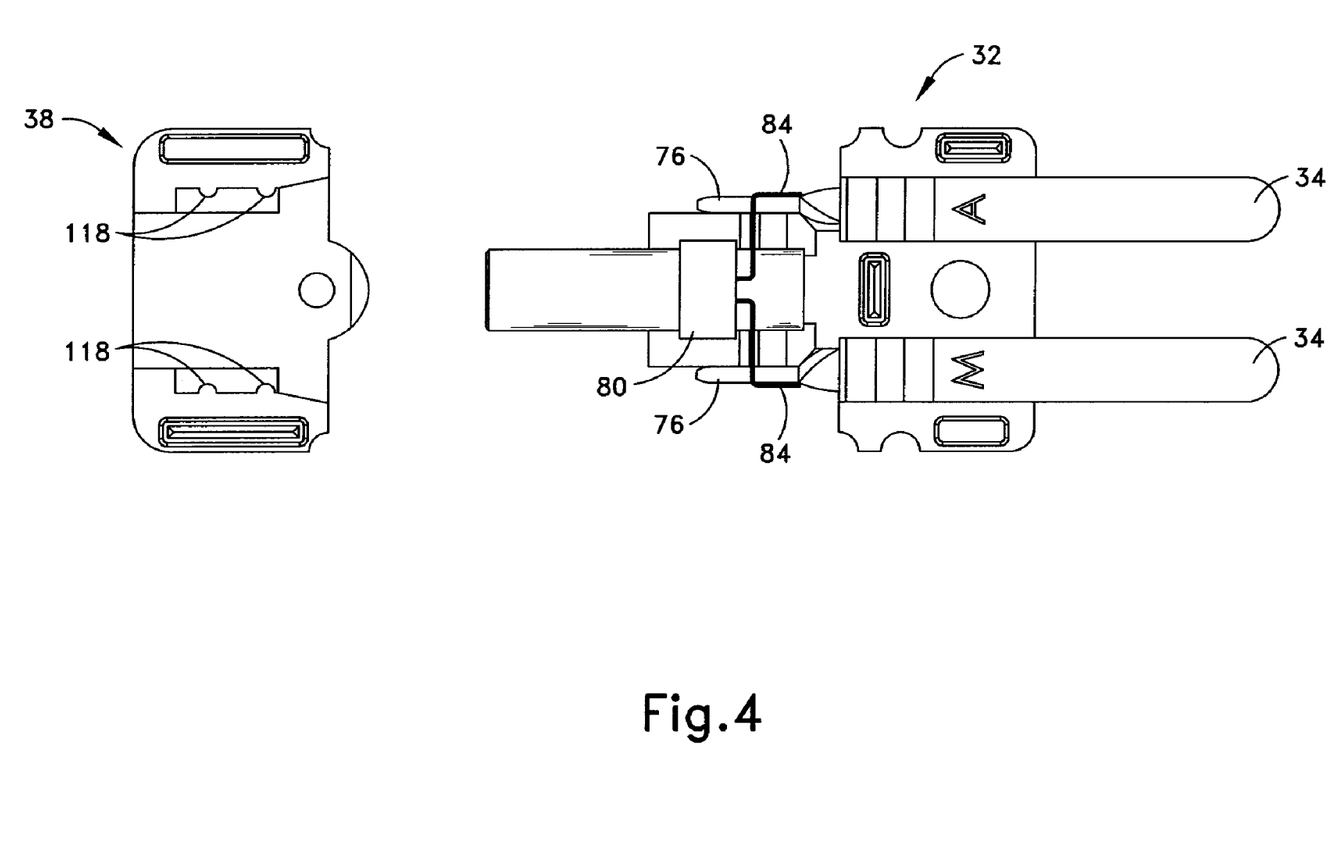
FIG. 4 illustrates a top cross-sectional view of a lower plug assembly for a thermocouple arrangement in accordance with an aspect of the present invention.

Within the shown example, wire cable 22 is elongate and flexible, and the wire cable has two wires 84 (FIG. 4). It should be noted that the connector could accommodate a wire cable, and included wires, of various size. The crimp adapter 80 may have structure and/or dimensions for different cable parameters. Further, different crimp adapters can be used for the different cable parameters, and the connector 20 is configured to accommodate such different crimp adapters. For instance, the connector 20 can be used with relatively thick wire cable having relatively thick wires and an associated crimp connector with structure and dimensions to accommodate the thickness. Likewise, the connector 20 can be used with a relatively thinner wire cable with associated thinner wires and a suitable crimp adapter. It is to be appreciated that the present invention permits the use of the varying thickness cables, wires, and associated crimp connector adaptors to address these varying thicknesses.

Turning back to the second function of the rear portion 74, the portion is configured to provide one half of a snap-lock interconnection between the body 32 and the cap 38. The snap-lock connection is described further below. However, it is to be noted that the rear portion 74 includes at least one (e.g., two) sloped surface 88 and at least one (e.g., two) drop-off shoulder 90. Each sloped surface 88 tapers upward as the sloped surface extends toward the front of the body 32. Each shoulder 90 is located near the front-most terminus of the respective sloped surface 88.

The shown example of the cap 38 of the connector 20 is made of two sections 98 and 100. These sections 98, 100 can be made of thermoplastic and are secured together in a manner similar to the manner used for the body 32. As noted above, various techniques can be used. For ease of reference, these sections 98, 100 are referred to as upper and lower sections, respectively. The upper section 98 includes at least one projection and at least one recess, and the lower section 100 includes at least one corresponding projection and at least one corresponding recess. When the upper and lower sections 98, 100 are mated together, each respective projection and recess pair is mated together. It is to be noted that in one example, the projections have structure that aid in securing the upper and lower sections 98, 100 together. For example, the structure may be raised material, e.g., in an elongate pyramidal shape, which flows upon occurrence of an ultrasonic welding procedure.

The cap 38 has an interior 110 that is bounded by the two sections 98, 100 and that provides multiple functions. First, the rear portion 74 of the body 32 is located within the interior 110 (e.g., shrouded within) when the body 32 and the cap 38 are connected together. Second, the interior 110 of the cap 38 is also configured to hole the wire cable (electrical connector lead) 22 in electrical contact with at least one (e.g., both) of the prongs 34. More specifically, at least one of the upper and lower portions of the cap 38 include one or more projections 118 (FIG. 4) to help retain the wires 84 in contact with the prongs 34. Thus, one of the housing parts engages the respective terminus and secures the respective terminus against removal by shrouding an end of the respective conductive mating part and pressing the respective terminus into electrical contact with the respective conductive mating part during the mating of the housing parts.

Although not illustrated, the upper section 98 of the cap 38 has at least one (e.g., two) projection that provides a second half of the snap-fit interconnection. Specifically, the projections are located and configured such that the projections will cooperate with the sloped surfaces 88 and the shoulders 90 of the rear portion 74 of the body 32 to snap-lock the cap 38 onto the body. During the mating of the cap 38 onto the body 32, the projections engage and ride along the sloped surfaces 88. As the cap 38 is moved toward a final position mated with the body 32, the sloped surfaces 88 deflect the projections and thus part of the cap outward. However, as the cap 38 reaches the final position, the projections arrive at the edge of the shoulders 90. Subsequently, the projections drop off of the shoulders 90 with a snapping action (i.e., the deflected portion of the cap snaps back). Thus, the projections rest against the shoulders 90.

It should be noted that the snap interlock mating could be accomplished by any other suitable snap interlock structure. This sort of snap interlock is commonly referred to as a one-way connection. It is to be noted that additional snap-lock structures may be utilized. For example, a tapered tip that has a recess can be located on the lower section of the cap 38. The tapered tip and the recess can interact with a pin-like projection on the outer side of the lower body section 42. The tapered tip is configured to slide over the pin-like projection and the pin-like projection snaps into the recess as the cap 38 is moved toward a final position mated with the body 32.

Turning to the connection of the wire cable 22 to the shown example connector 20, it is to be noted that the terminus of the wire cable 22 is extended through the cap 38 and the crimp adapter 80. As such, the terminus of the wire cable 22 can be thought of as an end portion of the wire cable. Of course, it is to be appreciated that some other aspect, e.g., only an end portion of one wire 84, can be thought of as a terminus. For example, a bared portion of the one wire 84 could be thought of as a terminus.

In preparation for connecting the terminus of the wire cable 22 to the connector 20, an end portion of any protective cable covering is removed (e.g., stripped) to expose the wires 84 contained therein. Further, any coverings on the two wires 84 are removed (e.g., stripped) at the terminus ends to expose the bare wires. Next, the bare wire ends are bent to the outer sides at a substantially 90-degree angle relative to the wire cable 22. Next, the bared wires 84 are positioned within slots 120 formed within the end portion 76 of the prongs 34 and slots 122 formed within the rear portion 74 of the lower body section 42 of the body 32. As shown in FIG. 4, the wire tips are then generally bent forward to lie adjacent the prongs 34. When the cap 38 is attached to the body 32 (e.g., via relative movement to complete the snap interlock), the projections 118 in the cap 38 will engage and ride over the rear end portions 76 of the prongs 34, thereby squeezing the wires into pressing contact with the respective prongs 34. Thus, between the engagement of the wires 84 within the slots 120 of the prongs 34 and the pressing engagement of the wires 84 with the prongs 34 via the projections 118 formed in the cap 38, electrical connection is established between each respective wire 84 and prong 34. No springs, screws, or additional components are needed to establish this electrical connection. Again, it is to be appreciated that the connector 20 thus has structure to retain (e.g., grasp) the wire cable.

It is to be appreciated that a portion of the body 32 does extend into the hollow interior 110 of the cap 38. This may be further appreciated upon viewing FIG. 3, which shows the hollow aspect of the cap 38, and FIG. 2, which shows the final assembly. In general, the connection of the wires 84 to the prongs 34 is considered to occur within the interior of the connector 20. Thus, the snap-lock interconnection not only secures the housing parts (e.g., the body and the cap) 32 and 38 together, but also encloses the interior.

Some of the features of the present invention should now be apparent. First, the two parts (e.g., the body and the cap) 32 and 38 of the connector 20 were connected without the use of any threaded fasteners, such as a screw, a bolt, or the like. Second, the terminus ends of the wires 84 are connected to the prongs 34 without the use of any springs or threaded fasteners, such as a screw, a bolt, or the like, or any additional components. Also, enhanced connection of the wires 84 to the prongs 34 occurs simultaneously with the connection of the cap 38 to the body 32.

Figure 5:
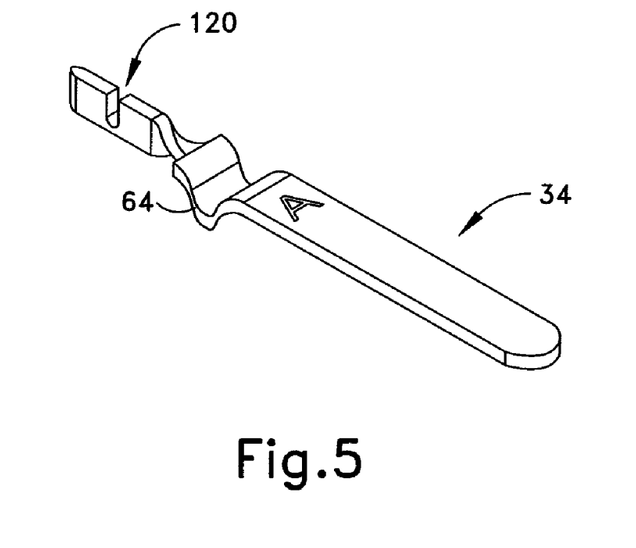
FIG. 5 illustrates a perspective view of a negative prong for a lower plug assembly in accordance with an aspect of the present invention.
Figure 6:
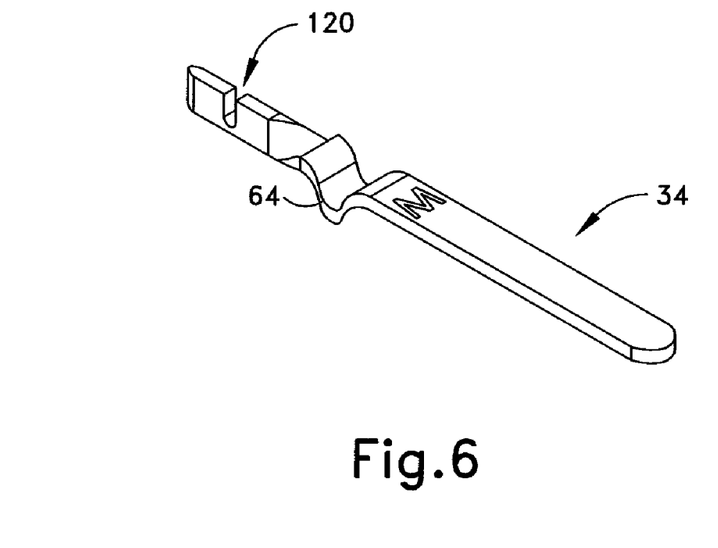
FIG. 6 illustrates a perspective view of a positive prong for a lower plug assembly in accordance with an aspect of the present invention.

FIGS. 5 and 6 illustrate the prongs 34 in greater detail in accordance with an aspect of the present invention. FIG. 5 illustrates the prong 34 associated with a negative electrical connection and FIG. 6 illustrates the prong 34 associated with a positive electrical connection. The prongs 34 are formed of a metal or any other suitable conductive material.

Figure 7:
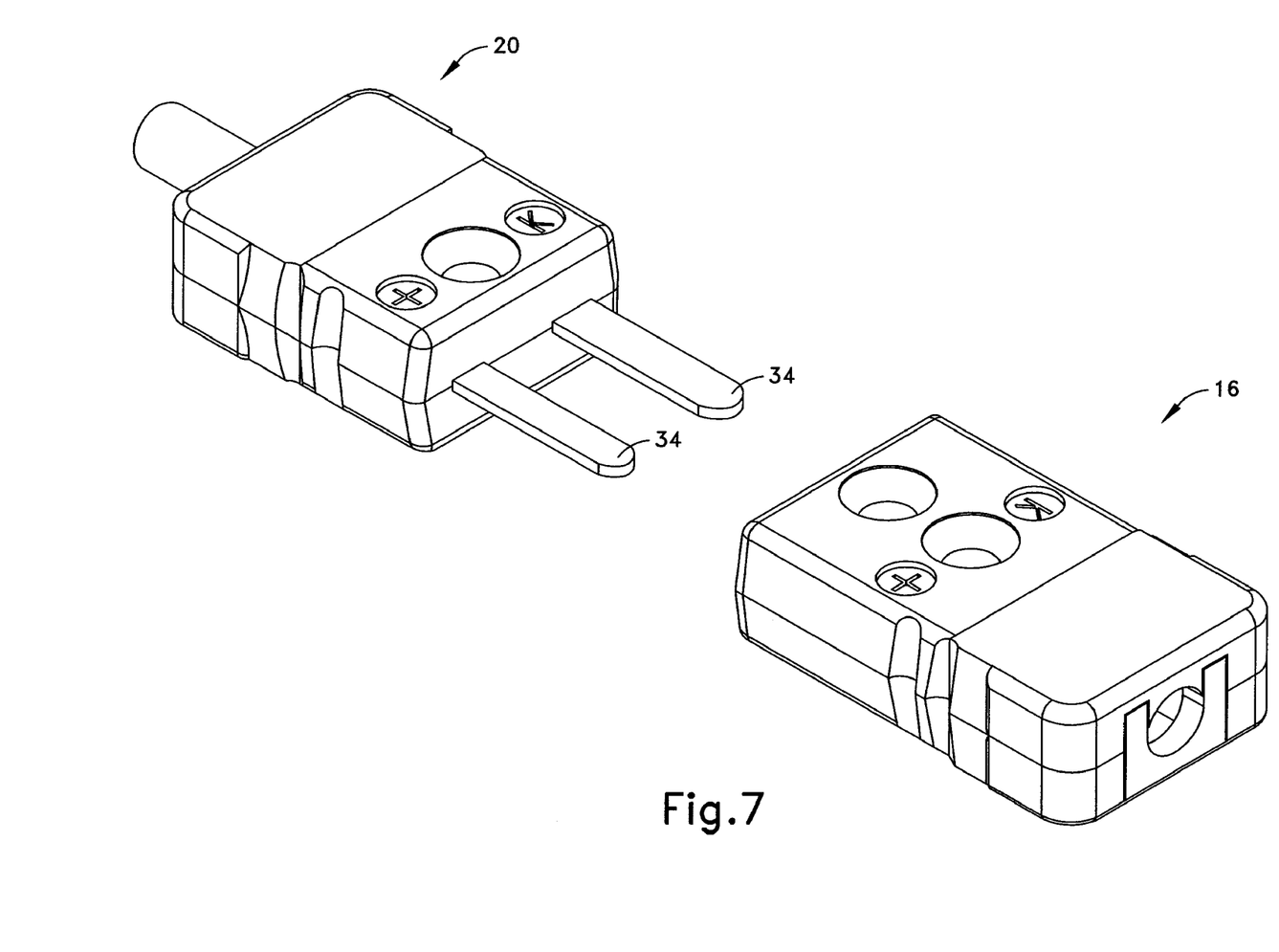
FIG. 7 illustrates a perspective view of a thermocouple arrangement in accordance with an aspect of the present invention.

FIG. 7 is a view of the first connector 16 shown within the plug connector 20. Specifically, the first connector 16 is a mate component to the plug connector 20 and can be referred to as a jack connector 16. The jack connector 16 contains many similar features and construction techniques as discussed above. Structures unique to the jack connector 16 can include metallic jack springs and inserts (not shown). The springs and inserts interact with the prongs 34 upon insertion of the prongs into the jack connector 16.

It is to be also noted that either the plug connector or the jack connector may be utilized with a cable or may be utilized with some other components such as a probe extension. Specifically, the connectors are not limited to the shown example uses, and it is contemplated that the plug connector or the jack connector may be reversed with regard to connections to the wire cable 22 and the thermocouple probe 14.

Figure 8:
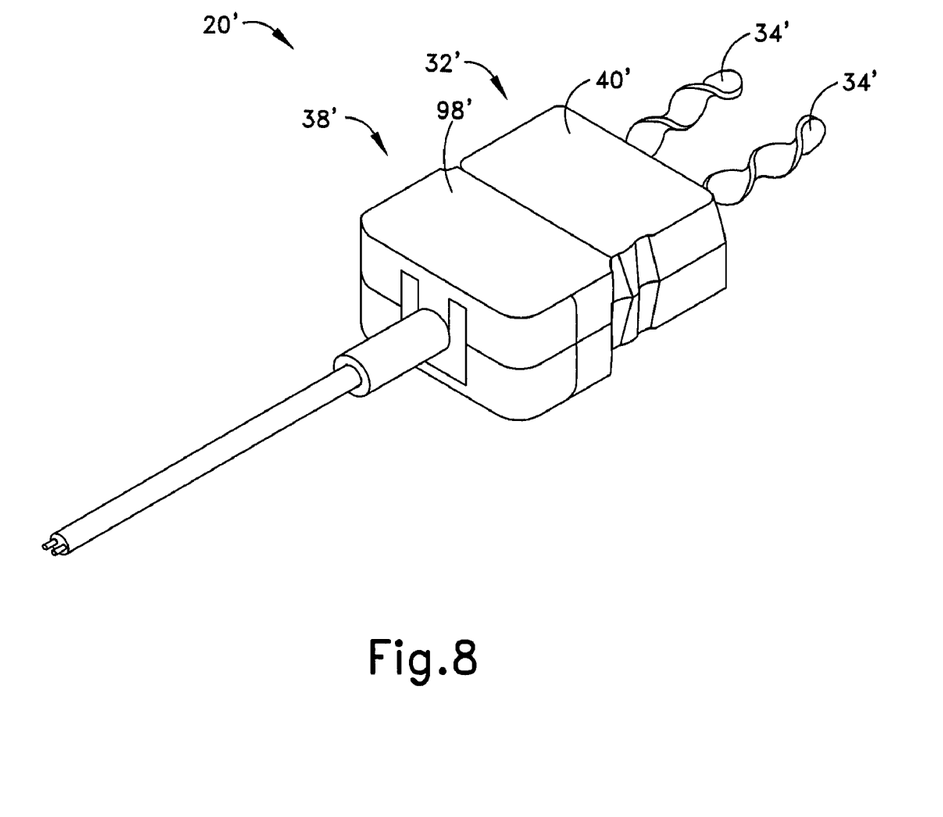
FIG. 8 illustrates a perspective view of another lower plug assembly for a thermocouple arrangement in accordance with an aspect of the present invention.

FIG. 8 shows a modification that has some similarity to the plug connector 20. As such, reference numerals that have an added prime ("'") are utilized to identify similar or even identical structure. Focusing on the modification features, the prongs 34' are different such that the prongs may be utilized to engage a corresponding round receptacle. Specifically, free ends (i.e., extending out from the connector body) of the prongs are twisted into a helix form. The edges of the twisted prong would then engage a round opening of a mating connector. It is contemplated that the connectors for which such a helix-prong configuration may have some of the same structural and functional features presented for the connectors 16 and 20. For example, one or both of the associated connectors may include housing parts that mate in a snap-lock arrangement to secure the housing parts together and to enclose the respective interior. Also one or both of the associated connectors may include structure that engages an electrical connection terminus and secures the terminus against removal without the use of a threaded fastener. As a further aspect, the engagement and securing without the use of a threaded fastener may occur during the mating of the housing parts.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the embodiments described herein.

What is claimed is:

1. A thermocouple connector arrangement including:
   a first connector configured to have a thermocouple probe lead extending therefrom, and having an interior configured to receive an electrical connection terminus of the thermocouple probe lead; and
   a second connector configured to have an electrical connection lead extending therefrom, and having an interior configured to receive a terminus of the electrical connection lead;
   the first and second connectors include electrically conductive mating parts that, when mated, provide an electrical conduction path between the thermocouple probe lead and the electrical connection lead;
   at least one of the first and second connectors includes housing parts that mate in a snap-lock arrangement without the use of a threaded fastener to secure the housing parts together and to enclose the respective interior, one of the housing parts having a portion with a slot through which the respective terminus extends, the other of the housing parts being a cap that bounds a portion of the respective interior and shrouds the portion of the one housing part with the slot and a segment of the respective conductive mating part at an end of the respective conductive mating part within the cap, the conductive mating part having a slot, located away from the end of the conductive mating part and aligned with the slot on the one housing portion, through which the respective terminus extends, the cap having an interior side wall segment that engages the respective terminus and secures the respective terminus against removal by pressing the respective terminus into electrical contact with the respective conductive mating part from the point of the respective terminus extending through the slot of the respective conductive mating part during the mating of the housing parts.

2. A thermocouple connector arrangement as set forth in claim 1, wherein the thermocouple probe is elongate and rigid, and the first connector has structure to support the thermocouple probe in a static position relative to the first connector.

3. A thermocouple connector arrangement as set forth in claim 1, wherein the electrical connection lead is elongate and flexible, and the second connector has structure to grasp the electrical connection lead.

4. A thermocouple connector arrangement as set forth in claim 1, wherein at least one of the conductive mating parts of the first and second connectors is a prong that includes a strip of conductive material twisted into a helix.

5. A thermocouple connector arrangement as set forth in claim 1, wherein the interior side wall segment of the cap that engages the respective terminus and secures the respective terminus against removal by pressing the respective terminus into electrical contact with the respective conductive mating part from the point of the respective terminus extending through the slot of the respective conductive mating part during the mating of the housing parts includes a plurality of projections located on the interior side wall segment.

6. A thermocouple connector arrangement as set forth in claim 1, wherein the segment of the respective conductive mating part that is at an end of the respective conductive mating part within the cap is a rear end portion, the rear end portion of the respective conductive mating part having a rotated orientation relative to the remainder of the respective conductive mating part.

7. A thermocouple connector arrangement as set forth in claim 1, wherein the one of the housing parts having front and rear portions, the portion with a slot through which the respective terminus extends being the rear portion, only the rear portion of the one housing part being shrouded within the cap.

8. A thermocouple connector arrangement as set forth in claim 7, wherein the segment of the respective conductive mating part that is at an end of the respective conductive mating part within the cap is located laterally relative to the a rear end portion which is the only portion of the one housing part being shrouded within the cap.

9. A thermocouple connector arrangement as set forth in claim 7, wherein the one of the housing parts includes separate upper and lower sections that entrap the respective conductive mating part there between.

10. A thermocouple connector arrangement as set forth in claim 9, wherein the respective conductive mating part includes at least one bent offset, at least one of the upper and lower sections includes a corresponding segment into which the bent offset is located.

11. A thermocouple connector arrangement including:
    a first connector configured to have a thermocouple probe lead extending therefrom, and having an interior configured to receive an electrical connection terminus of the thermocouple probe lead; and a second connector configured to have an electrical connection lead extending therefrom, and having an interior configured to receive a terminus of the electrical connection lead;

the first and second connectors include electrically conductive mating parts that, when mated, provide an electrical conduction path between the thermocouple probe lead and the electrical connection lead;

at least one of the first and second connectors includes housing parts that mate in a snap-lock arrangement without the use of a threaded fastener to secure the housing parts together and to enclose the respective interior, one of the housing parts engages the respective terminus and secures the respective terminus against removal by shrouding an end of the respective conductive mating part and pressing the respective terminus into electrical contact with the respective conductive mating part during the mating of the housing parts;

wherein the one of the housing parts includes a projection extending from a sidewall and within an interior of the one of the housing parts to press upon the respective terminus.

* * * * *